Oct. 28, 1941.   A. R. WYLIE   2,260,500
VACUUM CONNECTION
Filed May 31, 1941

Inventor
Arthur R. Wylie

Patented Oct. 28, 1941

2,260,500

UNITED STATES PATENT OFFICE 2,260,500

VACUUM CONNECTION

Arthur R. Wylie, Minneapolis, Minn., assignor to General Mills, Inc., a corporation of Delaware Application May 31, 1941, Serial No. 395,976

3 Claims. (Cl. 285—2)

An object of this invention is to provide a satisfactory vacuum connection between a metal tube and a glass tube particularly where the metal tube is smaller and in some instances may be inserted within the glass tube.

Figure 1:
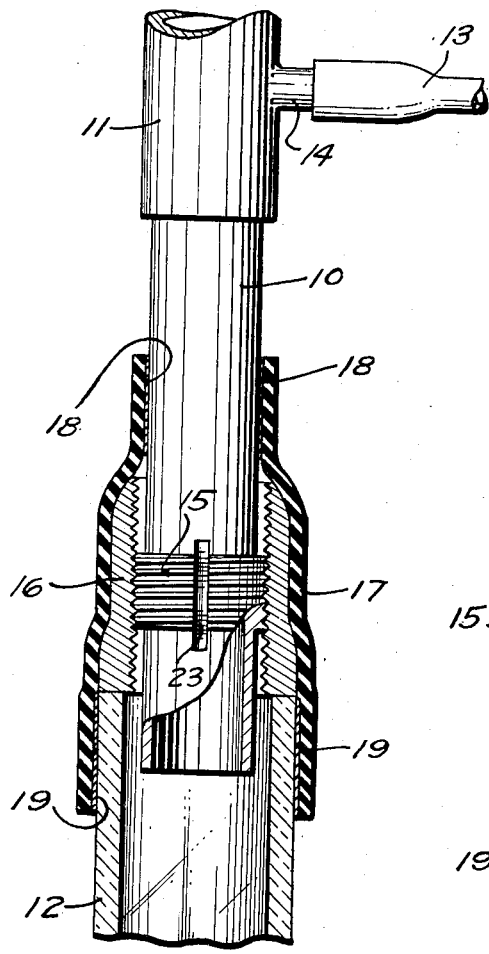
Figure 2:
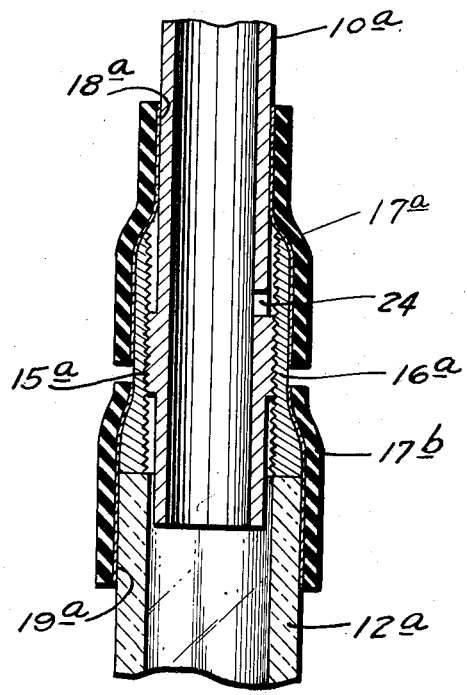

This and other objects as will hereinafter appear are accomplished by this invention which is fully described in the following specification and shown in the accompanying drawing in which Figure 1 is a partial side elevation partly in section showing an embodiment of the invention; and Fig. 2 is a similar view in section showing a modified form of the invention.

The embodiment illustrated in Fig. 1 shows apparatus particularly designed for use in vaporizing and treating a solid under a high vacuum and consists of a metal tube 10 having a vacuum-tight tubular connection 11 through which the material to be treated is fed by means not shown. It is desired to provide a vacuum-tight connection between the metal tube 10 and a glass tube 12, the metal tube preferably being smaller than the glass tube and extending thereinto as substantially shown. The whole is maintained under a high vacuum from a source not shown and connected to the tubular portion 11 through a tube 13 and nipple 14. The metal tube 10 is provided with an external thread 15 on which is screwed a tubular member 16 having a mating internal screw thread. It has a lower end adapted to abut against the upper end of the glass tube 12 and preferably of substantially the same external diameter. Thus, the member 16 may be adjusted to engage the upper end of the glass tube to position one tube with respect to the other so that when vacuum is applied thereto there will be no tendency for one to telescope on the other.

A rubber tubular sheath 17 entirely encloses the tubular member 16 and extends beyond it at both ends so as to enclose the upper end of the glass tube 12 and a portion of the tube 10.

A viscous liquid 18 is placed between the upper end of the rubber sheath and the metal tube and a similar coating of a viscous liquid having a low vapor pressure is placed between the sheath and the upper end of the glass tube. For this purpose castor oil is preferably used, but any other viscous liquid of low vapor pressure may be employed.

A saw-cut 23 is employed to provide a communication between the screw threads 15 and the liquid 18 so that any air or the like trapped therein will be readily drained.

Thus it will be seen that I have provided a very simple and efficient means for establishing an air-tight connection between the two tubes while their relative positions are fixed by the screw members.

In Fig. 2 is shown a modified form of the construction in which a tubular member 16a is similarly screwed onto the threaded portion 15a of a metal tube 10a and similarly butts up against the end of a glass tube 12a.

In this case, the metal tube or sheath is made up of two sections 17a and 17b. The portion 17a connects the tube 10a to the tubular member 16a while the portion 17b connects the tubular member 16a to the glass tube 12a. In this case, the viscous coating of castor oil, or the like 18a, extends throughout substantially the entire length of the tubular section 17a. Likewise, the viscous coating 19a extends throughout substantially the entire length of 17b.

In both these forms it will be observed that it is a very simple matter to break the vacuum connection by rolling the tubular sheath 17 back from the bottom so that the lower end is entirely free from the glass tube 12. Likewise in Fig. 2, rolling the rubber sheath section 17b up from the bottom so that it entirely uncovers the glass tube 12a enables this glass tube to be removed and a new one to replace it. If there is any difference in the length of the tubes, this difference is accommodated by the necessary adjustment of the tubular member 16 and 16a. After that, the tubular sheaths 17 and 17b are then rolled back over the glass tube.

While I have shown and described but two embodiments of my invention, it is to be understood that it is capable of many modifications. Changes, therefore, in the construction and arrangement may be made which do not depart from the spirit and scope of the invention as disclosed in the appended claims.

I claim as my invention:

1. In a vacuum connection of the class described, a glass tube, a tube having an external screw thread, a tubular member having an internal screw thread coacting therewith for adjustably securing the tubular member longitudinally on the tube so as to cause it to bear upon the end of the glass tube held in alignment with the tube to prevent said tubes from telescoping, the tubular member being of substantially the same external diameter as the glass tube, and elastic tube means impervious to air tightly enclosing one of the tubes and an adjoining tubular element to seal the space between the same.

2. In a vacuum connection of the class described, a glass tube, a tube having an external screw thread, a tubular member having an internal screw thread coacting therewith for adjustably securing the tubular member longitudinally on the tube so as to cause it to bear upon the end of the glass tube held in alignment with the tube to prevent said tubes from telescoping, the tubular member being of substantially the same external diameter as the glass tube, and elastic tube means impervious to air tightly enclosing both of the tubes to seal the space between the same.

3. In a vacuum connection of the class described, a glass tube, a tube having an external screw thread, a tubular member having an internal screw thread coacting therewith for adjustably securing the tubular member longitudinally on the tube so as to cause it to bear upon the end of the glass tube held in alignment with the tube to prevent said tubes from telescoping, elastic tube means tightly enclosing the tube and the tubular member, the tubular member being of substantially the same external diameter as the glass tube, and elastic tube means impervious to air tightly enclosing the tubular member and glass tube to seal the spaces between the same, the elastic tube means being coated on its contacting surfaces with a heavy viscous liquid of low vapor pressure.

ARTHUR R. WYLIE.